US005624616A

United States Patent [19]

Brooks

[11] Patent Number: 5,624,616

[45] Date of Patent: Apr. 29, 1997

[54] METHOD FOR CO-REFINING DRY URBAN WOOD CHIPS AND BLENDS OF DRY URBAN WOOD CHIPS AND THERMOPLASTIC RESINS FOR THE PRODUCTION OF HIGH QUALITY FIBERBOARD PRODUCTS

[76] Inventor: S. Hunter W. Brooks, 364 Thalia Ave., Rochester, Mich. 48307

[21] Appl. No.: 425,840

[22] Filed: Apr. 20, 1995

[51] Int. Cl.[6] .......... B29C 67/00

[52] U.S. Cl. .......... 264/83; 264/109; 264/115; 264/DIG. 69; 162/4; 162/10; 162/13

[58] Field of Search .......... 264/83, 115, 122, 264/DIG. 69, 109; 162/10, 13, 23, 4

[56] References Cited

U.S. PATENT DOCUMENTS

| | | | |
|---|---|---|---|
| 2,757,115 | 7/1956 | Heritage . | |
| 2,757,583 | 8/1956 | Basler | 162/10 |
| 2,759,837 | 8/1956 | Roberts | 162/13 |
| 2,872,337 | 2/1959 | Heritage et al. . | |
| 3,668,286 | 6/1972 | Brooks et al. | 162/13 |
| 4,402,896 | 9/1983 | Betzner et al. | 264/115 |
| 4,407,771 | 10/1983 | Betzner et al. | 264/115 |
| 5,093,058 | 3/1992 | Harmon et al. | 264/115 |
| 5,122,228 | 6/1992 | Bouchette et al. | 162/4 |
| 5,176,793 | 1/1993 | Kurtz | 164/4 |

FOREIGN PATENT DOCUMENTS

| | | | |
|---|---|---|---|
| 200097 | 3/1983 | German Dem. Rep. | 162/10 |

*Primary Examiner*—Mary Lynn Theisen
*Attorney, Agent, or Firm*—Vanophem Meehan & Vanophem

[57] ABSTRACT

A method for making lignocellulose fibers, which may be optionally coated with a suitable thermoplastic, wherein the starting materials may be chosen from a wide variety of generally non-recyclable contaminated wood, paper, and/or plastic products. A mixture of the preferred lignocellulose material characterized by a relatively low moisture content and the desired thermoplastics is refined and comminuted in a steam atmosphere which is at a temperature, pressure, and duration sufficient to soften both the lignin within the wood chips and the thermoplastic polymer. The temperature of the steam atmosphere is relatively high because of the use of dry wood chips which do not result in excessive vaporization during heating. The comminution of the mixture occurs by auguring the mixture between counter-revolving dual refining discs in the elevated temperature, pressurized steam atmosphere. Upon passing through the dual revolving refining discs, the wood chips are continually abraded so as to result in the formation of fine fibers of the lignocellulose material, while the softened thermoplastics are concurrently refined so as to adhere uniformly around each of the abraded lignocellulose fibers. After passing through the refining discs, the fibers are cooled resulting in the formation of uniformly coated lignocellulose fibers, which may be used to form a variety of consolidated fiberboard products, such as by hot pressing or cold pressing operations.

18 Claims, No Drawings

METHOD FOR CO-REFINING DRY URBAN WOOD CHIPS AND BLENDS OF DRY URBAN WOOD CHIPS AND THERMOPLASTIC RESINS FOR THE PRODUCTION OF HIGH QUALITY FIBERBOARD PRODUCTS

BACKGROUND OF THE INVENTION

1. Field of the Invention

The present invention generally relates to the fibers used in consolidated fiberboard products and methods for producing such fibers. More specifically, this invention relates to a method wherein the raw materials to be refined may be any of a number of generally non-recyclable contaminated woods, plastics, and papers which are then co-refined at elevated temperatures in high pressure steam to form thermoplastic-coated lignocellulose fibers that are suitable for consolidation into a variety of fiberboard products.

2. Description of the Prior Art

Waste disposal is an ever-increasing concern to society. Although recycling efforts have been relatively successful with a variety of materials, certain materials have continually posed a problem as being generally non-recyclable. Examples of these hard-to-recycle materials include "urban wood waste" such as demolition waste from old buildings, urban wood chips generated from construction materials, old pallets and boxes, and the like. Yet, it is believed that useful fiberboards could be produced from these materials if a means for recycling and refining these problematic materials could be found.

Generally speaking, the prior art has been successful in producing lignocellulose fibers from wood chips. In particular, U.S. Pat. No. 2,757,115 to Heritage teaches the production of lignocellulose fibers from wood chips and other lignocellulose waste products, such that the resultant fibers are useful for forming felted fiberboard products. Heritage forms the fibers by subjecting the lignocellulose material to pressurized steam while concurrently being rubbed and abraded. The steam acts to soften the lignin at the surface of the lignocellulose material, which is then rubbed or abraded away, thereby exposing the interior of the material which is likewise softened and abraded. This is repeated until the chip has been reduced to a fiber, which can then be pressed into felted fiberboard products. Although Heritage's teachings are useful for the formation of wood fibers from "green" wood waste products, i.e., wood products having a relatively high moisture content, or correspondingly with a solids content of about 40% to 50%, these teachings do not aid in the refinement of "urban wood waste" which is typically very dry, having a solids content of at least about 80% or more. In addition, Heritage required the use of relatively high horsepowers for refinement of the moist wood chips, because the temperature of the steam used for refining the lignocellulose material remained essentially only at the boiling temperature of water due to the continual vaporization of the moisture within the green wood chips.

Alternatively, U.S. Pat. No. 2,872,337 to Heritage et al. teaches the production of coated lignocellulose fibers for forming a coated felted fibrous mat. The lignocellulose fibers are generally produced by the method described above in the Heritage '115 patent; however, after the fibers are abraded, they are transported by the steam and mixed with a suitable thermosetting resinous binder so as to result in coated lignocellulose fibers which are useful for consolidating into fiberboard.

The shortcoming associated with the Heritage '115 patent is that, again, the teachings are limited to wood chips having relatively high moisture levels, and again, they require the use of relatively high horsepowers for the refinement of the wood chips. In addition, although they are producing coated fibers, they are doing so by utilizing virgin raw materials, i.e., virgin polymeric binder material with virgin wood chips.

Therefore, as can be readily appreciated by those skilled in the art, both Heritage patents tend to be relatively limited in the materials which can be processed in that they are limited to relatively high moisture content wood and if applicable, a virgin polymeric binder material. Furthermore, both Heritage patents utilize a process which involves relatively high horsepower requirements during refining.

Therefore the need exists for a relatively low horsepower process for refining wood chips, which can utilize a variety of the generally non-recyclable contaminated materials, such as dry wood chips from urban wood waste, which may be optionally combined with a suitable thermoplastic.

Accordingly, what is needed is a process for forming lignocellulose fibers which may be optionally thermoplastic-coated, and which are suitable for consolidation into a fiberboard product, wherein the starting materials can include a variety of materials, including generally non-recyclable wood, paper, and/or plastic products, and wherein the process does not require high horsepower loads during refinement of the chips.

SUMMARY OF THE INVENTION

According to the present invention there is provided a method for making lignocellulose fibers, wherein the starting materials may be chosen from a wide variety of generally non-recyclable contaminated wood products, in addition to a variety of virgin and contaminated paper, and/or plastic products. The high quality fibers produced by this invention are particularly suited for consolidation into a variety of fiberboard products.

Generally, the lignocellulose material (hereinafter also referred to as "wood chips" or "wood waste products") is provided by a variety of generally non-recyclable materials, such as urban wood waste like demolition waste from aged buildings and structures, construction waste, old pallets, and the like, alone or in combination with each other. The materials tend to be extremely dry as compared to "green" wood chips, and have solids content of from about 90% to 94%, but may have a solids content as low as about 80%. The wood chips which may be used with the method of this invention may vary greatly in size, including from about 3" Minus to about Plus ⅛", as defined by a conventional Ro-Tap Chip Screening System.

The diverse mixture containing the wood waste products is preheated in a steam atmosphere and at a temperature, pressure, and duration sufficient to concurrently soften the lignin within the wood chips. This preheating step produces a heated mixture which is soft and pliable, so as to foster the subsequent processing of the material, while the steam atmosphere results in the elimination of any air which may be present in the mixture.

The heated lignocellulose chips are subsequently transported to a refining region, wherein the chips are comminuted, again, in the high temperature steam atmosphere. The comminution of the lignocellulose chips occurs by passing the chips between counter-revolving dual refining discs, which are sufficiently grooved and in a predetermined spaced-apart relation to each other, so as to facilitate the abrading of the wood chips. Upon passing through the counter-revolving refining discs, the lignocellulose fibers within the wood chips are continually abraded so as to result in the formation of fine fibers of the lignocellulose material. This refining process is facilitated since the lignin itself within the wood chips is sufficiently softened by the high temperature of the steam.

Prior to or during the refining step, a suitable thermoplastic or combination of thermoplastics may be added to the wood chips and processed as described above so as to form thermoplastic-coated lignocellulose fibers. A suitable thermoplastic resin includes the thermoplastic commercially known as novolac, which is a phenol-formaldehyde type resin, although other suitable thermoplastic materials could also be used. The novolac or other thermoplastics may be added as powder, flakes, or waste plastics directly onto the urban wood chips as the wood chips enter the mechanism that will inject the mixture into the high pressure steam atmosphere employed in the digester and refining sections. The high pressure steam atmosphere softens the lignin within the wood chips while concurrently softening the thermoplastic materials, regardless of the form in which the thermoplastic materials are introduced with the wood chips, so as to result in an intimate bond with the lignin-coated cellulose fibers.

Upon reaching the melting temperature of the thermoplastic(s) employed, such as the novolac, the thermoplastic material will become a very low viscosity liquid that will tend to enter the wood pores, thereby becoming an intimate part of the wood fiber. The intimate nature of the novolac within and around each wood chip allows the resultant fibers to be consolidated into a high quality fiberboard product having excellent adherence between fibers. This results in the production of a high quality fiberboard product using very little thermoplastic resin.

In practice, high quality fiberboard products have been produced using the method of this invention wherein the novolac resin solids content is less than about 2%, as compared to conventional fiberboard products requiring approximately about 12% to about 16% of a resin, such as a resole phenolic resin. In addition, the use of the novolac resin with the method of this invention results in a product which is approximately 99% formaldehyde free with the only byproduct of this reaction being ammonia, which again differs significantly from conventional practices which use resoles or urea resin systems. Lastly, the use of the resin in combination with the teachings of this invention allows the use of steam injection press techniques, which is advantageous in that the final fiberboard product formed with the method of this invention leaves the press at an equilibrium moisture content, thereby eliminating the conventional requirement for rehumidification of the final fiberboard product.

In addition, it is foreseeable that other suitable thermoplastics could be utilized with or without the novolac resin, if the thermoplastics were characterized by a melting temperature of at least about 170° C. (338° F.), which is compatible with the temperature utilized during the refining of the wood chips. Foreseeable suitable thermoplastics would include, but are not limited to, those thermoplastics which are generally non-recyclable, such as contaminated thermoplastic products of polyethylene, polypropylene, polyvinylchloride, or a combination of these materials. Alternatively, the thermoplastic may be provided by non-recyclable composite paper products having an adhesive, such as laminated Kraft papers, bumper sticker-type materials, or self-sticking label materials, as well as others, which use an adhesive or film. The paper component of these non-recyclable paper products may also provide additional lignocellulose material to the mixture.

The thermoplastic component of the preferred lignocellulose/thermoplastic mixture should not exceed about 50%, by weight, more preferably not greater than about 30%, and most preferably from about 1.5% to about 30%, but may vary greatly depending on the particular final product desired. As stated previously, generally the thermoplastic will be chosen from the group consisting of a phenol-formaldehyde type resin such as novolac, or a polyethylene, polypropylene, polyvinylchloride, or a mixture of any combination of these polymers. However, the process is not limited to these materials, but rather any contaminated or virgin thermoplastics which will sufficiently soften above a temperature of about 170° C. (338)°F., or alternatively, at a temperature of about 170° C. and a saturated steam pressure of about 100 psig.

In the preferred embodiment of this invention, during refining, the steam is preferably maintained at a pressure of up to about 200 psig, which corresponds to a temperature of about 198° C. (388° F.). This temperature is sufficient to soften the lignin within the wood chips, regardless of the size of the chip, and if applicable, also the thermoplastics, during preheating and refining.

In the prior art practices, temperatures above the boiling point of water were difficult to achieve because the prior art employed "green" wood chips having a relatively high moisture content. The high moisture content of the "green" wood chips caused the temperature of the steam atmosphere to remain near the boiling point of water, thus insufficiently softening the lignin within the wood chips, thereby requiring much higher horsepower requirements to abrade the chips. With the use of extremely dry wood chips in the method of this invention, significantly higher temperatures are possible during refinement causing sufficient softening of the lignin, thereby requiring significantly lower horsepower requirements as compared to the prior art.

In practice, the energy required during refining is relatively low as compared to the prior art processes. Generally, refinement of the dry wood chips preferred in this invention, regardless of initial size of the chip, requires about a 10 to 12 horsepower days/oven dry (O.D.) short ton requirement, as compared to a requirement of about 25 to 80 horsepower days/O.D. short ton which is conventional with high moisture content "green" wood chips.

After the fibers are produced in the refining zone the fibers are discharged through an orifice or discharge valve located at the exit of the refiner system. The steam now becomes a conveying medium into the blow line. The sudden release of this steam and fibers from 200 psig steam pressure in the refiner section to atmospheric pressure in the blow line causes a sudden temperature drop which correspondingly causes the thermoplastic to uniformly solidify on the wood fiber, essentially instantaneously, upon discharge from the refining zone.

The fibers produced by the method of this invention, regardless of whether the fibers are thermoplastic-coated, may then be used to form a variety of consolidated fiberboard products, such as low, medium, or high density fiberboard.

A significant advantage of the present invention is that the process enables the use of generally non-recyclable contaminated wood products of a variety of sizes, characterized by an extremely low moisture content, to form usable wood fibers for consolidation into a variety of fiberboard products. This is accomplished using wood chips which are characterized by a relatively low moisture content, and exposing the dry wood chips to a high temperature, pressurized steam atmosphere during refining, which thus enables the use of relatively low horsepower requirements to produce the fibers. In addition, a variety of thermoplastic materials, including generally non-recyclable paper and plastic products may also be utilized in the process to form coated wood fibers.

In the past, it was believed that only "moist" wood chips having a solids content of 40% to 50% could be processed in this type of manner. Yet, the teachings of this invention permit the use of extremely dry woods having a solids content of at least about 80 to 90%, and preferably at least about 94% solids.

Furthermore, the prior art has never taught or suggested how to process these generally non-recyclable diverse wood, paper and plastic materials, particularly the processing of the combination of these diverse materials as with the present invention.

Accordingly, it is an object of the present invention to provide a method for forming lignocellulose fibers from dry wood chips of a variety of sizes, such as ranging from relatively large wood chips of the 3" Minus size to the relatively small wood chips of the Plus ⅛" size.

It is a further object of this invention that the lignocellulose fibers be formed from starting materials which include any of a number of generally non-recyclable contaminated wood products.

It is still a further object of the invention that the starting materials be refined in high pressure steam at elevated temperatures between counter-revolving dual refining discs, so as to form the lignocellulose fibers.

It is yet another object of this invention that the refining of these dry chips in the high temperature, high pressure steam atmosphere utilize relatively low horsepower requirements.

In addition, it is still a further object of this invention that the process of this invention permit the use of appropriate thermoplastic materials, which are added to the lignocellulose materials prior to or during the refining step, so as to form thermoplastic-coated wood fibers.

Lastly, it is an object of the invention that the wood fibers, or thermoplastic-coated wood fibers, of this invention be suitable for consolidation into a variety of fiberboard products.

Other objects and advantages of this invention will be more apparent after a reading of the following detailed description.

DETAILED DESCRIPTION OF THE PREFERRED EMBODIMENT

The method of this invention forms lignocellulose fibers which may be optionally coated with a suitable thermoplastic material. The coated fibers are uniformly and intimately coated with the thermoplastic and are suitable for consolidation into a variety of fiberboard products, such as by either hot pressing or cold pressing operations. The method of this invention is adaptable to a wide variety of starting materials including, but not limited to, generally non-recyclable contaminated wood products, contaminated papers, and/or plastic products.

The preferred lignocellulose material, or "wood chips", for use with this invention is characterized by being extremely dry, such as, but not limited to, generally non-recyclable urban wood waste products like demolition waste from aged buildings and structures, construction waste, old pallets, and the like, which may be used alone or in combination with each other. These extremely dry lignocellulose materials are characterized by solids contents of greater than about 80%, preferably as great as about 90% to 94% solids. The wood chips may vary greatly in size, such as from about 3" Minus to Plus ⅛", although chip sizes outside of this range could also be employed with the method of this invention.

In accordance with the preferred method of this invention, the wood chips are preheated in a steam atmosphere and at a temperature, pressure, and duration sufficient to soften the lignin within the wood chips. The use of extremely dry wood chips enables the use of significantly higher temperatures, as compared to the use of relatively moist "green" wood chips, which due to vaporization causes the temperature of the steam atmosphere to remain near the boiling temperature of water.

Preferably, although not necessary, a suitable thermoplastic or combination of thermoplastics may be added to the wood chips during this preheating step, or alternatively prior to or during the refining step which is described subsequently, so as to form thermoplastic-coated lignocellulose fibers. A suitable thermoplastic resin includes the thermoplastic commercially known as novolac, which is a phenol-formaldehyde type resin, although other thermoplastics may also be used.

Other suitable thermoplastics could also be utilized if the thermoplastics were characterized by a melting temperature of at least about 160° C. (320° F.) in pressurized saturated steam at about 100 psig, which is compatible with the conditions utilized during the refining of the wood chips. Examples of suitable thermoplastics would include thermoplastic products of polyethylene, polypropylene, polyvinylchloride, or a combination of these materials, which may be in the form of generally non-recyclable contaminated products. Typically plastic waste products which are found to be contaminated and unsuitable for conventional recycling efforts are formed from polypropylene, polyethylene or polyvinylchloride.

Alternatively, the thermoplastic may be provided by non-recyclable composite paper products having an adhesive, such as laminated Kraft papers, bumper sticker-type materials, or self-sticking label materials, as well as others, which use an adhesive of some sort. The paper component of these non-recyclable paper products may also provide additional lignocellulose material to the mixture. Any adhesives which may be present from the optional use of laminated Kraft paper products, labels, bumper sticker products, or the like are present in such a small amount as compared to the total mixture that their presence merely acts to further adhere the various components of the resultant coated fibers. The contaminated plastic and/or paper materials are typically provided in chips of about 1" square and several mils thick, although the process of this invention is capable of handling various sizes for the woods, plastics and paper products.

The type and amount of the thermoplastic component within the preferred lignocellulose/thermoplastic mixture will vary greatly depending on the particular application intended for the resultant coated fibers. Preferably, the thermoplastic component should not exceed about 50% by weight of the mixture, in that an amount greater than this would tend to greatly obstruct the processing of the fibers due to the tackiness associated with the heated thermoplastics, and also would result in a coated fiber of inferior physical properties for subsequent consolidation into a fiberboard product. However, it is foreseeable that a need could arise for a coated fiber containing more than 50% thermoplastic, in which the teachings of this invention could be applied. Nevertheless, more preferably, the amount of the thermoplastic component does not exceed about 30%, and most preferably ranges from about 1.5% to about 30%. It has been determined that these preferred ranges result in coated fibers having superior physical properties for subsequent consolidation into a fiberboard article, thereby optimizing the subsequent molding of the fibers and the final molded product.

Initially, the dry wood chips are fed to a chip hopper, or similar container. The chip hopper has a feed screw that controls and meters the rate of delivery of the raw wood chips to a rotary valve. The rotary valve, or similar device such as a plug screw feeder, transfers the dry wood chips from atmospheric pressure into a high pressure steam digester where the chips are preheated. The novolac, or other thermoplastic materials, may be added to the wood chips as powder, flakes, or waste plastics as the wood chips enter the rotary valve, or plug screw feeder, which injects the mixture into the high pressure steam atmosphere of the digester and refining system, described more fully later.

This preheating step produces a heated, blended mixture of dry wood chips and optionally thermoplastic materials, which is soft and pliable, so as to foster the subsequent processing of the material. Although not necessary, the mixing and preheating steps occur concurrently so as to simplify the processing steps.

The pressure within the digester is maintained at about 200 psig or less, more preferably it is maintained at about 175 psig, of saturated steam, which corresponds to a temperature of about 192° C. (377° F.). The high pressure steam results in the elimination of any air which may be present within the mixture, so as to avoid any oxidation of the thermoplastic materials within the mixture, if employed. The amount of steam required is approximately about 0.5 to about 0.75 pounds of steam per dry pound of O.D. fiber produced. This range in saturated steam values will provide sufficient heat for the method of this invention, therefore the pressure and temperature of the steam atmosphere may vary so long as the amount of saturated steam is within this range. Although it is to be noted that the steam must be at a pressure of at least about 100 psi, saturated, since below this value there is insufficient heat for processing of the dry wood chips and optionally thermoplastic materials.

The digester has a variable speed screw that controls the duration of time which the mixture is exposed to the high pressure steam within the digester. The duration within the digester will vary depending on the particular materials being used. However, the temperature, pressure, and duration within the digester must be sufficient to soften the lignin within the wood chips and also sufficiently soften the thermoplastic materials. The high pressure steam atmosphere will sufficiently soften the thermoplastic, regardless of the form in which the thermoplastic materials are introduced to the wood chips. Accordingly, it is preferred that the duration be at least about 30 seconds. Preferably, the duration of exposure within the digester is no more than about 6 minutes so as to avoid any unwanted fusion and break down of the components prior to the refining step, with an optimum length of time being about 30 seconds to about 1 minute, although the duration of exposure may vary considerably depending on the particular materials and end result desired. The result of this step is a heated mixture of lignocellulose and thermoplastic materials which is soft and pliable, so as to foster their subsequent processing.

The heated, pliable, raw material mixture is then transported in the pressurized steam atmosphere via a digester screw conveyor to the refining section containing a dual revolving disc refiner, wherein the pliable mixture is comminuted in the same pressurized steam atmosphere. In accordance with a preferred embodiment of this invention, this is accomplished as follows.

The comminution of the lignocellulose chips occurs by passing the chips between counter-revolving dual refining discs, which are sufficiently grooved and in a predetermined spaced-apart relation to each other, so as to facilitate the abrading of the wood chips. Upon passing through the counter-revolving dual refining discs, the lignocellulose fibers within the wood chips are continually abraded so as to result in the formation of fine fibers of the lignocellulose material. This refining process is facilitated since the lignin itself within the wood chips is sufficiently softened by the temperature of the steam.

The preheated raw material mixture is dropped from the digester down through an expansion joint into a variable speed cross transfer metering screw that is operating in 100% full condition. It is preferred, although not necessary, that the cross transfer metering screw be operating at 100% full condition, so as to allow the metering of the mixture from the digester into a twin chip feed screw which augers the raw mixture through the spokes of one of the revolving discs within the dual revolving disc refiner.

The preferred embodiment includes the comminution of the raw mixture by utilizing a dual revolving disc refiner. Other means for comminution do not appear to produce suitable results. For example, the fiber quality obtained from a single revolving disc refiner appears to be insufficient for producing high quality fiberboard products. The dual revolving discs employed in this invention result in a superior end product.

As stated, in the preferred embodiment, the comminution of the heated, pliable raw mixture occurs by auguring the mixture between dual refining, counter-rotating, discs. The dual refining discs are in a predetermined spaced-apart relation to each other so as to be capable of abrading the fibers within the lignocellulose material. Preferably, the dual revolving discs are spaced about 0.25 mm to about 1.25 mm from each other, with a spacing of about 0.275 mm being most preferred for effective abrasion of the wood chips, particularly for the production of fiberboard products.

Also, it is preferable that at least one of the dual discs, and most preferably each of the dual discs, be grooved, so as to facilitate the rubbing and abrading of the wood material, as well as the softened thermoplastics, as they pass through the revolving discs. A suitable disc which has been successfully utilized for both revolving discs is a refiner plate, Pattern Number 36325 and 36326, by Andritz Sprout-Bauer. That disc is 36" in diameter and characterized by a series of subsurface dams and grooves, wherein the grooves are characterized by a width of about 0.187" to 0.312", and a depth of about 0.125" to 0.375". Other suitable patterned discs could also be used, so long as they promote the rubbing and abrading of the composite materials.

Preferably, the dual discs rotate in counter directions so as to most efficiently abrade the materials within the refiner. It has been determined that a speed of rotation of not greater than about 1800 rpm is acceptable for each of the discs. Preferably, a speed of rotation of about 900 to 1200 rpm is more acceptable, in that the higher speeds tend to produce fibers which are extremely fine, i.e., too high a percentage of fibers finer than a 200 mesh size, which tend to be difficult for subsequent forming into consolidated fiberboard products. It has been determined that a disc speed, for each of the dual discs, of about 900 to 1200 rpm appears to be preferable for forming fibers which are suitable for consolidation into fiberboard products. However, depending on the disc spacing, the moisture content, and the particular application for the resultant fibers, the speed of rotation may vary considerably.

As an example, urban wood waste from Wood Conversion, Inc. of Brampton, Ontario, which was characterized by an average moisture content of about 20%, and therefore an average solids content of about 80%, was passed through the refiner at various disc spacings and disc speeds, so as to determine the resultant fiber sizes. The results of the fiber size characterization are reported below in TABLE I. The fibers were analyzed using a Bauer McNett 203C Classifier (TAPPI Standard T233 CM-82).

TABLE I

| | A | B |
|---|---|---|
| Average Disc Spacing (mm) | 0.74 | 0.84 |
| Discs RPM | 1200 | 1800 |
| FIBER CLASSIFICATION | | |
| % on 14 Mesh | 41.9 | 41.5 |
| % on 28 Mesh | 22.1 | 14.1 |
| % on 48 Mesh | 15.2 | 10.2 |
| % on 100 Mesh | 9.6 | 7.2 |
| % on 200 Mesh | 2.9 | 1.8 |
| % Through 200 Mesh | 8.3 | 25.1 |

The feed screw continually augers the unrefined mixture into the dual revolving discs and the refined fibers out of the disc region. Therefore, the duration in which a portion of the mixture passes through and contacts the dual revolving discs is extremely short and difficult to quantify, i.e., on the order of microseconds, and is sufficient for forming the appropriately sized coated fibers which are suitable for subsequent consolidation. The duration is dependent on the disc diameter and the throughput requirements.

While passing through the counter revolving, dual refining discs, the lignocellulose fibers within the wood chips, as well as the thermoplastic materials, are continually abraded so as to result in the formation of fine fibers of the lignocellulose material which are uniformly coated with the thermoplastic material. This is accomplished since the lignin itself within the wood chips is sufficiently softened by the temperature of the pressurized steam, while concurrently the thermoplastics are sufficiently softened so as to adhere and fuse uniformly around each of the abraded lignocellulose fibers.

As stated previously, the steam atmosphere used throughout the method of this invention, including during the refining step when the mixture is augered between the dual refining discs, is preferably maintained at a pressure of up to about 200 psig, which corresponds to a temperature of about 198° C. (388° F.), or at least a steam pressure corresponding to a temperature of at least about 160° C. (320° F.). This temperature is sufficient to soften the lignin and if applicable, the thermoplastics, during preheating and refining. In addition, the energy required during refining is relatively low as compared to the prior art processes because of the higher thermal energy employed with this method.

Generally, refinement using the dual refining discs, of the dry wood chips which are preferred with this invention, regardless of initial size of the chip, requires about a 10 to 12 horsepower days/O.D. short ton requirement, as compared to a 20 to 80 horsepower days/O.D. short ton requirement which is conventional with high moisture content "green" wood chips. The use of extremely dry woods having a solids content of at least about 80 to 90%, and preferably at least about 94% with the method of this invention, enables the steam atmosphere to reach relatively high temperatures, such as up to about 198° C. (388° F.), since there is relatively little vaporization from the dry wood chips. Higher processing temperatures as compared to the prior art correspondingly enable a lower horsepower requirement during refining of the chips.

The higher processing temperatures also facilitate the concurrent uniform softening of the thermoplastic material, if employed, so as to result in the formation of uniformly coated fibers. Upon reaching its melting temperature when exposed to the high temperature, pressurized steam atmosphere, the preferred thermoplastic material, novolac, will become a very low viscosity liquid that will tend to enter the wood pores, thereby becoming an intimate part of the wood fiber. The intimate nature of the novolac thermoplastic within and around the wood chip allows the fibers to be subsequently consolidated into a high quality fiberboard product having excellent adherence between fibers. This results in the production of a high quality fiberboard product using very little thermoplastic resin. In practice, high quality fiberboard products have been produced using the method of this invention wherein the resin solids content is less than about 2%, as described more fully below.

After passing through the dual refining, counter-revolving discs, the coated fibers are discharged through an orifice or discharge valve located at the exit of the refiner system, which feeds a blow line. The steam now becomes a conveying medium into the blow line. The sudden release of the fibers from 200 psig steam pressure in the refiner section to atmospheric pressure in the blow line causes a sudden temperature drop from about 198° C. (388° F.) to below at least about 130° C. (266° F.) causing the refined fibers and thermoplastics to cool immediately, such that the thermoplastic solidifies on the wood fiber almost instantaneously upon discharge from the refining zone, so as to permit the subsequent handling and processing of the coated fibers.

If preferred for the particular application, a hardener, such as Hexamine, or other catalyst for use with the thermoplastic materials, may be added in sufficient quantities to the coated fibers after the fibers have cooled by exposure to atmospheric pressure in the blow line.

When using the preferred novolac thermoplastic phenolic, a curing agent which contains formaldehyde, such as the Hexamine, is added to the novolac-coated fibers, to create the novolac's thermosetting characteristics. By carefully controlling the amount of Hexamine added in the blow line to the novolac-coated fibers, the resultant fiberboards produced by these fibers are essentially 99% formaldehyde free—a highly desirable feature of this invention. This extremely low level of formaldehyde in the end product is a significant improvement over the conventional processes which utilize resoles or urea resin systems. In addition, under subsequent hot pressing of the novolac-coated fibers, formaldehyde is released from the Hexamine when the Hexamine reaches a temperature of at least about 160° C. (320° F.). The formaldehyde then reacts with the Phenol groups within the novolac, thereby resulting in an extremely stable wood fiber for use in consolidated fiberboard products. Furthermore, advantageously, the only byproduct of this reaction is ammonia which is vented to atmosphere.

Upon exposure to atmospheric pressure in the blow line, a conventional cyclone separator separates the refined coated fibers from the steam. The steam exits the top of the cyclone separator, where the steam is then vented to atmosphere, or condensed. The refined fibers, which may or may not be coated with a thermoplastic, exit the lower half of the cyclone separator, whereby the cooled fibers can then be baled, or blown, or otherwise collected for subsequent use.

The coated fibers formed in accordance with the method of this invention are characterized by a uniform coating of thermoplastic. The thickness of the coating on the fibers will vary greatly depending on the amount of thermoplastic used, as well as the final size of the fiber. The coated fibers may be used to form a variety of consolidated low, medium, and high density fiberboard products, such as are formed by conventional hot pressing or cold pressing operations, or alternatively other pressing procedures such as steam injunction pressing processes.

Illustrative examples of the teachings of this invention are as follows. Novolac-coated fibers were produced in accordance with the teachings of this invention and then consolidated into fiberboards characterized by various densities.

In particular, the novolac-coated fibers are readily consolidated by the use of steam injection pressing techniques, although other pressing techniques may also be employed. The novolac-coated fibers are steam injection pressed by the introduction of saturated steam at a pressure of approximately 180 psig to 200 psig. The saturated steam is forced through the fiberboard, and cures the novolac quickly, i.e., as little as 20 to 30 seconds for a fiberboard product ranging from about ⅛" to about ½" thick. Advantageously, when using the steam injection pressing techniques, the pressed fiberboard is at an equilibrium moisture content, thereby eliminating the conventional requirement for rehumidification of the final fiberboard product.

As stated previously, other pressing techniques may also be employed with the teachings of this invention. Novolac-coated fibers were produced by this invention and then consolidated into fiberboards characterized by various densities using hot pressing techniques at a 205° C. platen temperature.

A number of fiberboards were produced from novolac-coated fibers having an average solids content of about 89% and an average novolac content of about 1.89% (as compared to conventional techniques which utilize resole phenolic resin or urea formaldehyde resin wherein the end product of a medium density fiberboard requires between about 12% and 16% of the resin). The resultant boards of this invention were characterized by an average internal bond strength, which is the tensile strength measured perpendicular to the surface, of about 121 psi when pressed to a density of about 64.2 pounds/ft$^3$, and an average thickness of about 2.58 mm; and an average internal bond strength of about 170 psi when pressed to a density of about 68.0 pounds/ft$^3$ at an average thickness of about 2.68 mm.

Fiberboards were produced from novolac-coated fibers having an average solids content of about 95% and an average novolac content of about 3.79%. The resultant boards were characterized by an average internal bond strength of about 170 psi when pressed to a density of about 60.7 pounds/ft$^3$ and an average thickness of about 2.84 mm; and also an average internal bond strength of about 225 psi when pressed to a density of about 65.4 pounds/ft$^3$ at an average thickness of about 3.02 mm.

Fiberboards were also produced from the same type of fibers having an average solids content of about 98% and an average novolac content of about 5.93%. The resultant boards were characterized by an average internal bond strength of about 250 psi when pressed to a density of about 58.2 pounds/ft$^3$ at an average thickness of about 3.14 mm; and also an average internal bond strength of 250 psi when pressed to a density of about 54.8 pounds/ft$^3$ at an average thickness of about 3.10 mm.

In addition, it is to be noted that the fibers produced in accordance with this invention which are coated with the novolac appear to have an indefinite shelf life, so long as they are stored at temperatures below about 100° C.

It is to be noted that other thermoplastics, such as generally non-recyclable, contaminated thermoplastic products of polyethylene, polypropylene, polyvinylchloride, or a combination of these materials, may also optionally be used with or without the novolac to form the coated fibers of this invention. If using these types of thermoplastics to form coated fibers with the method of this invention, upon pressing the coated fibers, the fiberboard must first be heated to at least the softening temperature of the thermoplastic(s) to achieve sufficient adherence. In addition, the boards must also be cooled to below about 120° C. (250° F.) to remove the product from the press without undue sticking of the product. By utilizing a small amount of the novolac resin with these thermoplastic(s), the removability of the consolidated fiberboard from the hot press is enhanced without the requirement for cooling of the fiberboard below 120° C.

A significant advantage of the present invention is that the method enables the use of generally non-recyclable contaminated wood products of a variety of sizes, which are characterized by a relatively low moisture content, to form usable wood fibers for consolidation into a variety of fiberboard products. The dry wood chips enable the use of a high temperature, pressurized steam atmosphere which correspondingly lowers the horsepower requirements needed to refine the fibers. In addition, a variety of thermoplastic materials, including virgin thermoplastics such as the preferred novolac resin and/or generally non-recyclable paper and plastic products may also be utilized in the process to form coated wood fibers.

In the past, it was believed that only "moist" wood chips having a solids content of 40% to 50% could be processed with pressurized steam and relatively high horsepower requirements. Yet, the teachings of this invention permit the use of extremely dry woods having a solids content of at least about 80 to 90%, and preferably at least about 94% solids.

The higher processing temperatures as compared to the prior art which are required for refinement of the dry wood chips in accordance with this invention, not only result in lower horsepower requirements during refining of the chips, but also facilitate the concurrent softening of the thermoplastic material, if added to the wood chips, so as to result in the formation of uniformly coated fibers.

Furthermore, an extremely timely advantage of this invention is that the preferred method furthers the recyclability of a diverse group of materials, which have been generally considered non-recyclable, such as urban wood waste, and contaminated plastic and paper materials. The prior art has never taught or suggested how to process these generally non-recyclable diverse wood, paper and plastic materials, particularly the processing of the combination of these diverse materials as with the present invention.

Accordingly, the present invention provides a method for forming lignocellulose fibers, which may be optionally coated with a suitable thermoplastic such as novolac, wherein the fibers of this invention are particularly suited for consolidation into fiberboard products.

While the invention has been described in terms of a preferred embodiment, it is apparent that other forms could be adopted by one skilled in the art. For example, the particular means for mixing and comminuting the materials, as well as the particular means for metering and transporting the materials through the process, could be easily modified by those skilled in the art. Accordingly, the scope of the invention is to be limited only by the following claims.

What is claimed is:

1. A method for forming lignocellulose fibers which are suitable for consolidating into a fiberboard product, said method comprising the steps of:

providing a plurality of lignocellulose chips derived from one or more materials chosen from the group consisting of urban wood waste, demolition wood waste, pallets and adhesive-coated papers, said plurality of lignocellulose chips being characterized by a nominal moisture content of about 20% by weight or less;

heating said plurality of lignocellulose chips in a saturated steam atmosphere characterized by a temperature of at least about 170° C. and a pressure of at least about 100 psig, said heating in said saturated steam atmosphere being for a duration sufficient to soften the lignin within said plurality of lignocellulose chips;

comminuting said plurality of heated lignocellulose chips in said saturated steam atmosphere so as to sufficiently abrade said plurality of lignocellulose chips, thereby resulting in the formation of uniformly sized lignocellulose fibers of sufficient diameter for consolidation into a predetermined shape and density; and drying said lignocellulose fibers;

wherein said heating step entails supplying steam at a ratio of about 0.5 to about 0.75 pounds of steam per dry pound of said lignocellulose fibers produced by said comminuting and drying steps.

2. The method of claim 1 wherein said plurality of lignocellulose chips range in size from about 3" Minus to about Plus ⅛".

3. The method of claim 1 wherein said comminuting step comprises passing said plurality of heated lignocellulose chips between counter-revolving dual discs spaced apart about 0.25 to about 1.25 mm from each other.

4. The method of claim 1 wherein a phenol-formaldehyde type thermoplastic resin is added in an amount of less than about 2 weight percent to said plurality of lignocellulose chips prior to said comminuting step.

5. The method of claim 1 wherein thermoplastic materials chosen from the group consisting of polyethylene, polypropylene, polyvinylchloride, individually or as a mixture of any combination of these thermoplastic materials is added to said plurality of lignocellulose chips prior to said comminuting step, said thermoplastic materials being characterized by the ability to soften in said saturated steam atmosphere.

6. The method of claim 1 wherein the drying step comprises discharging said lignocellulose fibers from said saturated steam atmosphere so as to undergo a rapid change to atmospheric pressure and temperature.

7. The method of claim 1 wherein said uniformly sized lignocellulose fibers are consolidated into a predetermined shape and density by the introduction of saturated steam.

8. A method for forming thermoplastic-coated lignocellulose fibers which are suitable for consolidating into a fiberboard product, the method comprising the steps of:

providing a plurality of lignocellulose chips derived from one or more materials chosen from the group consisting of urban wood waste, demolition wood waste, pallets and adhesive-coated papers, said plurality of lignocellulose chips being characterized by a nominal moisture content of about 20% by weight or less;

heating said plurality of lignocellulose chips in a saturated steam atmosphere characterized by a temperature of at least about 170° C. and a pressure of at least about 100 psig, said heating in said saturated steam atmosphere being for a duration sufficient to soften the lignin within said plurality of lignocellulose chips;

adding to said plurality of lignocellulose chips, either prior to or during said heating step, up to about 30 weight percent of a phenol-formaldehyde type thermoplastic resin, said heating step being sufficient to soften said phenol-formaldehyde type thermoplastic resin so as to result in a heated pliable mixture and so as to avoid the oxidation of said phenol-formaldehyde type thermoplastic resin;

comminuting said heated pliable mixture in said saturated steam atmosphere so as to sufficiently abrade said plurality of lignocellulose chips, thereby forming a plurality of lignocellulose fibers which are intimately coated with said phenol-formaldehyde type thermoplastic resin; and drying plurality of lignocellulose fibers;

wherein said heating step entails supplying steam at a rate of about 0.5 to about 0.75 pounds of steam per dry pound of said plurality of lignocellulose fibers produced by said comminuting and drying steps, said plurality of coated lignocellulose fibers being characterized by a sufficient diameter and a sufficient content of said phenol-formaldehyde type resin so as to permit their consolidation into a predetermined shape and density.

9. The method of claim 8 wherein said phenol-formaldehyde type thermoplastic resin is a novolac thermoplastic resin that is added in an amount of less than about 2 weight percent to said plurality of lignocellulose fibers prior to said comminuting step.

10. The method of claim 8 wherein said plurality of lignocellulose chips range in size from about 3" Minus to about Plus ⅛".

11. The method of claim 8 wherein said comminuting step comprises passing said heated pliable mixture between counter-revolving dual discs spaced apart about 0.25 to about 1.25 mm from each other.

12. The method of claim 8 wherein the drying step comprises discharging said lignocellulose fibers from said saturated steam atmosphere so as to undergo a rapid change to atmospheric pressure and temperature.

13. The method of claim 8 wherein said uniformly sized lignocellulose fibers are consolidated into a predetermined shape and density by the introduction of saturated steam.

14. A method for forming thermoplastic-coated lignocellulose fibers which are suitable for consolidating into a fiberboard product, the method comprising the steps of:

providing a plurality of lignocellulose chips derived from one or more materials chosen from the group consisting of urban wood waste, demolition wood waste, pallets and adhesive-coated papers, said plurality of lignocellulose chips being characterized by a nominal moisture content of about 10% by weight or less;

heating said plurality of lignocellulose chips, with less than about 2% by weight of a novolac thermoplastic material, wherein said heating step is in a saturated steam atmosphere at a temperature and pressure sufficient to be equivalent to at least about 1000 BTU per pound of steam, and said novolac thermoplastic material is characterized by sufficient softening when exposed to said saturated steam atmosphere, such that the lignin within said plurality of lignocellulose chips and said novolac thermoplastic material is sufficiently softened when contacted by said saturated steam atmosphere so as to result in a heated pliable mixture and so as to avoid the oxidation of said novolac thermoplastic material, said heating step being insufficient to fuse said novolac thermoplastic material to said plurality of lignocellulose chips;

comminuting said heated pliable mixture in said saturated steam atmosphere at said temperature and said pressure, said comminuting being sufficient to abrade said plurality of lignocellulose chips and said novolac thermoplastic material, thereby forming thermoplastic-coated lignocellulose fibers;

whereby said thermoplastic-coated lignocellulose fibers are of sufficient diameter and of sufficient thermoplastic content to permit their consolidation into a predetermined shape and density.

15. The method of claim 14 wherein said plurality of lignocellulose chips range in size from about 3" Minus to about Plus ⅛".

16. The method of claim 14 wherein said comminuting step comprises passing said plurality of heated lignocellulose chips between counter-revolving dual discs spaced apart about 0.25 to about 1.25 mm from each other.

17. The method of claim 14 wherein the drying step comprises discharging said lignocellulose fibers from said saturated steam atmosphere so as to undergo a rapid change to atmospheric pressure and temperature.

18. The method of claim 14 wherein said uniformly sized lignocellulose fibers are consolidated into a predetermined shape and density by the introduction of saturated steam.

* * * * *

UNITED STATES PATENT AND TRADEMARK OFFICE

CERTIFICATE OF CORRECTION

PATENT NO. : 5,624,616

DATED : April 29, 1997

INVENTOR(S) : Brooks

It is certified that error appears in the above-identified patent and that said Letters Patent is hereby corrected as shown below:

Column 3, line 43, after "use of the", kindly insert ---- novolac ----.

Column 4, line 13, kindly delete "(338)°F." and insert ---- (338 °F.) ----.

Column 6, line 5, between "1/8"," and "although", kindly insert a space.

Column 14, line 26, after "drying", kindly insert ---- said ----; same line, after "of", kindly insert ---- said ----.

Column 14, line 29, after "of", second occurrence, kindly insert ---- coated ----.

Column 14, line 39, kindly delete "fibers" and insert ---- chips ----.

Column 14, line 48, kindly delete "the", second occurrence, and insert ---- said ----.

UNITED STATES PATENT AND TRADEMARK OFFICE

CERTIFICATE OF CORRECTION

PATENT NO. : 5,624,616

DATED : April 29, 1997

INVENTOR(S) : Brooks

It is certified that error appears in the above-identified patent and that said Letters Patent is hereby corrected as shown below:

Column 14, line 49, after "said", first occurrence, kindly insert ---- plurality of coated ----.

Column 14, line 52, kindly delete "uniformly sized", and insert ---- plurality of coated ----.

Column 16, line 10, kindly delete "wherein the", and insert ---- further comprising after said comminuting step a ----.

Column 16, line 11, before "comprises", kindly insert ---- which ----; same line, after "said", first occurrence, kindly insert ---- thermoplastic-coated ----.

UNITED STATES PATENT AND TRADEMARK OFFICE

CERTIFICATE OF CORRECTION

PATENT NO. : 5,624,616

DATED : April 29, 1997

INVENTOR(S) : Brooks

It is certified that error appears in the above-identified patent and that said Letters Patent is hereby corrected as shown below:

Column 16, line 16, kindly delete "uniformly sized", and insert

---- thermoplastic-coated ----.

Signed and Sealed this

Ninth Day of February, 1999

*Attest:*

*Attesting Officer*

*Acting Commissioner of Patents and Trademarks*